United States Patent
Godbehere et al.

(10) Patent No.: US 6,669,806 B1
(45) Date of Patent: Dec. 30, 2003

(54) METHOD OF CONSTRUCTING SKIN FOR A MEMBER OF A BODY SUCH AS AN AIRCRAFT

(75) Inventors: Andrew P Godbehere, Winscombe (GB); Stephen Williams, Ebbw Vale (GB); Robert D Spear, Bristol (GB)

(73) Assignee: BAE Systems PLC (GB)

( * ) Notice: Subject to any disclaimer, the term of this patent is extended or adjusted under 35 U.S.C. 154(b) by 0 days.

(21) Appl. No.: 09/490,954

(22) Filed: Jan. 24, 2000

Related U.S. Application Data

(63) Continuation of application No. PCT/GB99/02668, filed on Dec. 8, 1999.

(30) Foreign Application Priority Data

Aug. 15, 1998 (GB) ............................................. 9817778

(51) Int. Cl.[7] .......................... B32B 31/00; B29C 70/30
(52) U.S. Cl. ...................................... 156/265; 156/264
(58) Field of Search ................................ 156/264, 265; 66/84 A

(56) References Cited

U.S. PATENT DOCUMENTS

| 3,617,613 A | * | 11/1971 | Benzinger et al. | |
|---|---|---|---|---|
| 4,571,355 A | * | 2/1986 | Elrod | |
| 4,741,943 A | | 5/1988 | Hunt | |
| 5,809,805 A | * | 9/1998 | Palmer et al. | 66/84 A |

FOREIGN PATENT DOCUMENTS

| DE | 29 05 701 | 8/1980 |
|---|---|---|
| EP | 0 511 937 A1 | 11/1992 |
| FR | 2 202 809 | 5/1974 |

OTHER PUBLICATIONS

IMB Technical Disclosure Bulletin, "Prepreg Flipper", Oct. 1, 1988, Issue No. 5, vol. 31, pp. 455–456.*

* cited by examiner

*Primary Examiner*—Jeff H. Aftergut
(74) *Attorney, Agent, or Firm*—Barnes & Thornburg

(57) ABSTRACT

The method of constructing a skin for a member 30 of a body such as an aircraft comprises providing from a multi-axial fabric first and second pieces A, A1 shaped to correspond respectively to the shape of the member 30 to be covered by the skin and to the shape of a similar member 32 on the opposite side of the body, and inverting one of the pieces and placing it on the other. The method may include providing third and fourth pieces B, B1 from multi-axial fabric shaped to correspond respectively to the shape of the member 30 to be covered by the skin and to the shape of the similar member 32 on the opposite side of the body and inverting one of the third and fourth pieces B, B1 and placing it on the other to form a skin for the similar member. In order to minimise wastage the method preferably includes forming the first piece A and third piece B from areas of the fabric which lie alongside each other and/or forming the second piece A1 and the fourth B1 piece from areas of the fabric which lie alongside each other.

17 Claims, 1 Drawing Sheet

METHOD OF CONSTRUCTING SKIN FOR A MEMBER OF A BODY SUCH AS AN AIRCRAFT

This is a continuation of International Application No. PCT/GB/99/02668, filed Dec. 8, 1999.

The invention relates to a method of constructing a skin for a member of a body, for example the skin of an aircraft wing.

It is known to produce wing skins from composite laminae. Such laminae are produced by a process known in the art as "laying up" using, for example, carbon fibre tape. The tape is laid up in a multi-axial manner by a tape laying machine which provides a high degree of accuracy. The term "Multi-axial" means that alternate layers of tape will be laid by the machine in several different directions to produce a skin fabric having optimum strength in required directions. Commonly used directions for wing skin manufacture are 0° (spanwise for the wing) ±45°, −45° and 90° (substantially chordwise).

In order for the skin to exhibit the correct characteristics when in position on, say, the completed wing, it is desirable that the laminae forming the skins be balanced. For example taking the case of a multi-axial skin having eight layers or plies a balanced lay-up from face to face could be as follows:

+45° −45°, 90°, 0°, 0°, 90°, −45°, +45°

The laying up process is slow and a object of the present invention is to enable a balanced laminae arrangement to be constructed more quickly and easily than known hitherto.

According to a first aspect of the invention there is provided a method of constructing a skin for a member of a body such as an aircraft, the method comprising providing from a multi-axial fabric first and second pieces shaped to correspond respectively to shape of the member to be covered by the skin and to that of a similar member on the opposite side of the body, and inverting one of the pieces and placing it against the other to provide the skin.

By using the method in accordance with the invention, the placing of one of the pieces against the other produces the balanced laminae arrangement as described above. Also, a skin substantially double the thickness of each of the separate pieces can be made without having to produce the skin by a single laying up process, thus reducing production time.

The method may include, forming third and fourth pieces from multi axial fabric shaped to correspond respectively to the shape of the member to be covered by the skin and to the shape of the similar member on the opposite side of the body and inverting one of the third and fourth pieces and placing it on the other to form a skin for the similar member.

The method may further include forming the pieces from areas of the fabric which lie alongside each other. In that way, fabric wastage is minimised.

The areas of the fabric are preferably elongate and preferably extend substantially in a common longitudinal direction. In such a case, the method may include forming the multi-axial fabric with a layer of 0° fibres extending in the longitudinal direction of said areas thereof.

Preferably, the method includes forming the multi-axial fabric by joining together edges of a plurality a fabrics made by a laying up process. In such a case, the method may include producing at least one of the first and second pieces in such a way that said piece is formed partly from one of said plurality of fabrics and partly from the other joined thereto. The joint between the two fabrics preferably runs in the one of the axial directions of the multi-axial fabric, for example in the 0° direction.

In a preferred embodiment, the member is an aerofoil such as a wing on the body and the method include shaping the first and second pieces to correspond respectively to the plan view shape of the aerofoil and to that of a similar aerofoil on the opposite side of the body, inverting one of the pieces and placing it against the other to provide a skin for one of the aerofoils.

According to a second aspect of the invention there is provided a skin for a member of a body such as an aircraft, the skin being constructed in accordance with the method of the first aspect of the invention or any of the consistory clauses relating thereto.

According to a third aspect of the invention there is provided an aircraft aerofoil having a skin made in accordance with the method of the first aspect of the invention or any of the consistory clauses relating thereto.

A method in accordance with the invention will now be described by way of example with reference to the accompanying drawings, in which.

Figure 1:
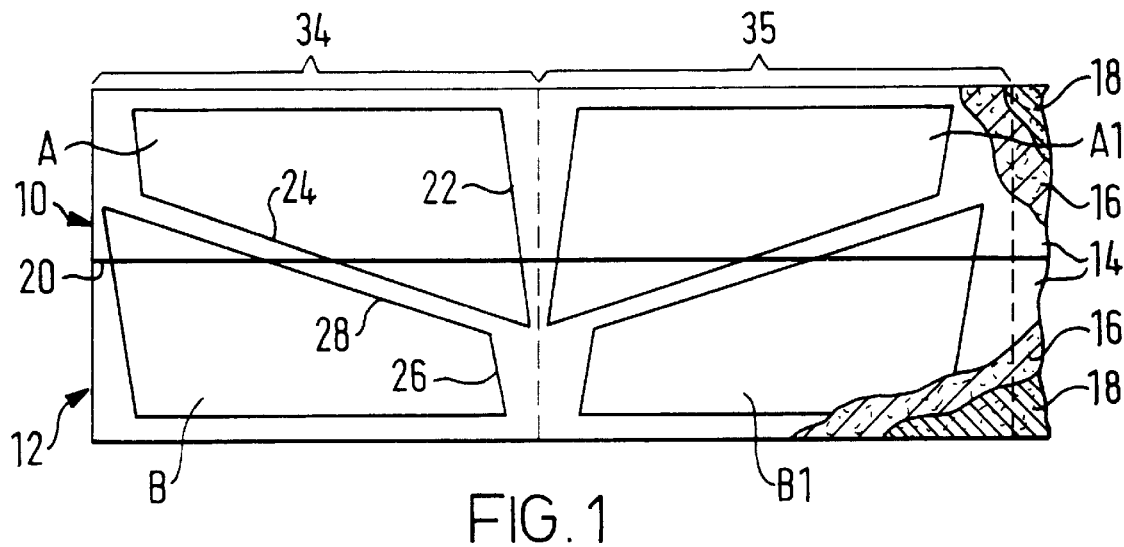
FIG. 1 is a plan view of a multi-axial fabric having thereon wing-skin patterns for wings on both sides of an aircraft and shown partly broken away.

Looking at FIG. 1, two lengths 10, 12 of multi-axial fabric are provided. Each length of fabric has a 0° layer 14, a −45° layer 16 and a +45° layer 18. Such a fabric is also disclosed in our UK Patent Application No. 9817777.7 filed Aug. 15, 1998 and in our co-pending International Patent Application No. PCT/GB99/(Ref. MA/B014PCT) claiming priority therefrom, entitled "Composite Material Construction" and filed simultaneously with this application.

The two lengths of fabric 10,12 are joined together along a joint line 20. Again, the joint line is disclosed in the aforesaid co-pending application and the reader is directed to the specification thereof for full details of the joint. The joint will not be described in detail in the present application.

The two lengths of material 10,12 are joined together so that their 0° layers 14 form the upper surface of the fabric as viewed in FIG. 1, and the +45° layers form the lower surface of the fabric.

An elongate wing-skin pattern is applied to the joined fabrics 10,12 so as to form four discrete areas B, B1 and A, A1. The areas A, A1 are substantially mirror images of each other and the areas B, B1 are likewise substantially mirror images of each other. The patterns A, A1 correspond substantially to wing skin plan view shapes for right and left hand wings 30, 32 respectively and the patterns B, B1 similarly correspond to wing skin plan view shapes for the respective left and right hand wings. The areas are then cut out to produce four pieces. In the embodiment illustrated it will be noted that the joint line 20 runs through each piece. The 0° layer runs longitudinally of the four areas preferably parallel with the joint line 20.

Figure 2:
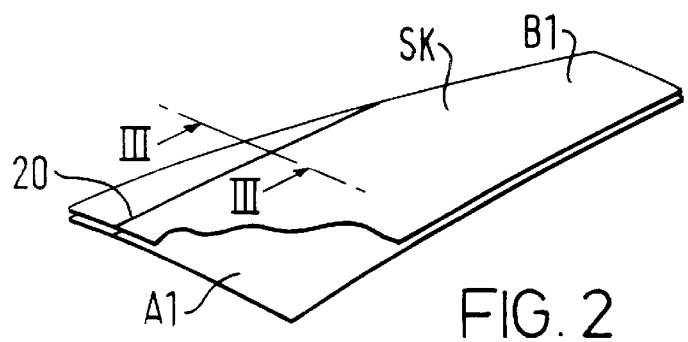
FIG. 2 is a perspective view partly broken away showing the way in which two pieces cut from the fabric have been inverted and placed on each other to form a wing-skin.

The cut out piece A corresponding to the shape of the right hand wing 30 can be inverted about its inner edge 22 and laid on cut out piece cut out piece A1 corresponding to the shape of the left hand wing 32 or can be inverted about its leading edge 24 and placed on B1. Similarly, the cut out piece B corresponding to the shape of the right hand wing 30 can be inverted about its outer edge 26 and placed on the cut out piece B1 corresponding to the shape of the left hand wing or can be inverted about its leading edge 28 and placed on A1. The latter arrangement is shown in FIG. 2. By following the inversion process the wing-skin cross-section will take the form shown in FIG. 3 showing a balanced arrangement of laminae as follows:

| laminae | 18   | 16   | 14 | 14 | 16   | 18   |
|---------|------|------|----|----|------|------|
| axes    | +45° | −45° | 0° | 0° | −45° | +45° |

Figure 3:
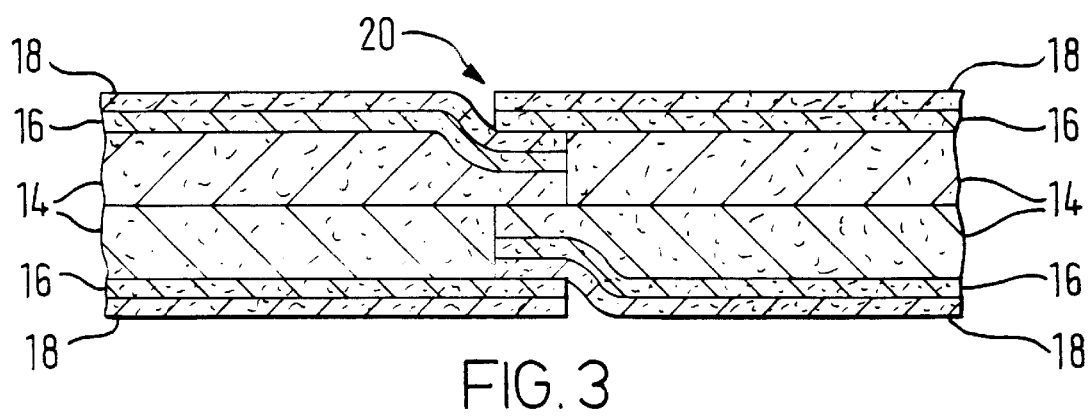
FIG. 3 shows to a larger scale a cross-section through a wing-skin shown in FIG. 2 on the line III III in FIG. 2.

Several fabric cross-sections as shown in FIG. 3 can be produced and laid one upon the other to form an even thicker wing-skin and, if desired, the wing skin can be gradually tapered from the wing root end towards the wing tip end by reducing the numbers of larninae towards the wing tip. Where tape is used to produce the fabric, it is normally pre-impregnated with epoxy resin which is in an uncured stated in the laying up process and when cut to produce the pieces A, A1, B, B1. Once the desired skin thickness has been built up, the wing-skins are then placed in an autoclave under heat and pressure to compress the fabric layers, create a bond between them and effect curing of the epoxy resin to complete the skin. The wing-skin may, however, be formed from layers of fabric to which a suitable bonding matrix is applied as described in our aforesaid co-pending application.

Figure 4:
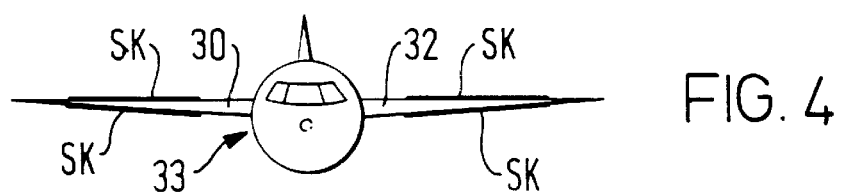
FIG. 4 is a diagrammatic front view of an aircraft having wing skins made by the method of the present invention.

By making up four wing skins as shown in FIG. 2 and indicated at SK, the skins, when cured, can be orientated and used to form upper and lower surfaces on the wings 30,32 extending from a fuselage 33 of an aircraft as shown in FIG. 4.

If desired, the pieces A, B can be made from a first piece of fabric 34 and the pieces A, B from a separate second piece of fabric 35 rather than from a continuous piece By arranging the areas A, B and A1, B1 alongside each other in the manner shown in FIG. 1, maximum use is made of the fabric with minimum wastage. Also, as the skin thickness can be effectively doubled by laying one piece upon another, it is necessary only to lay up the basic fabric 10, 12 instead of having to lay-up fabrics of double thickness thereby saving lay-up time.

If desired smaller discrete pieces A, A1, B, B1 can be made from single fabric lengths not joined at 20 and can be arranged in a similar manner to minimise wastage. However, using joined fabrics 10,12 is particularly advantageous as the wing skin construction time is reduced by doing so.

What is claimed is:

1. A method of constructing a skin for a member of a body such as an aircraft, the method comprising the steps of
   providing a multi-axial fabric having at least three differently oriented fiber layers,
   forming first and second pieces from said multi-axial fabric so that said first and second pieces are shaped to correspond respectively to a shape of a member on one side of said body to be covered by said skin and to a shape of a similar member on an opposite side of said body,
   inverting one of said first and second pieces, and
   placing said one of said first and second pieces on the other of said first and second pieces to form said skin for said member.

2. The method of claim 1, further comprising the steps of
   forming third and fourth pieces from said multi-axial fabric such that said third and fourth pieces are shaped to correspond respectively to the shape of said member on said one side of a body and to the shape of said similar member on said opposite side of the body to be covered by said skin,
   inverting one of said third and fourth pieces, and
   placing said one of said third and fourth pieces on the other of said third and fourth pieces to form said skin for said similar member.

3. The method of claim 1, further comprising the step of placing said first and second pieces one upon the other and bonding them together.

4. A method of constructing a skin for a member of a body, the method comprising the steps of
   providing a multi-axial fabric having at least three differently oriented fiber layers,
   forming first and second pieces from said multi-axial fabric so that said first and second pieces are shaped to correspond respectively to a shape of a member on one side of said body to be covered by said skin and to a shape of a similar member on an opposite side of said body,
   forming third and fourth pieces from said multi-axial fabric such that said third and fourth pieces are shaped to correspond respectively to the shape of said member on said one side of a body and to the shape of said similar member on said opposite side of the body to be covered by said skin,
   said first and third pieces being formed from areas of said multi-axial fabric which lie alongside each other and said second and fourth pieces being formed from areas of said multi-axial fabric which lie alongside each other,
   inverting one of said first and second pieces,
   placing said one of said first and second pieces on the other of said first and second pieces to form said skin for said member
   inverting one of said third and fourth pieces, and
   placing said one of said third and fourth pieces on the other of said third and fourth pieces to form said skin for said similar member.

5. The method of claim 4, in which said areas of said fabric from which said pieces are formed are elongate and extend substantially in a common longitudinal direction.

6. The method of claim 5, comprising forming said multi-axial fabric with a layer of fibers extending in said longitudinal direction of said areas.

7. A method of constructing a skin for a member of a body, the method comprising the steps of
   providing a multi-axial fabric having at least three differently oriented fiber layers by joining together edges of a plurality of lengths of fabric,
   forming first and second pieces from said multi-axial fabric so that said first and second pieces are shaped to correspond respectively to a shape of a member on one side of said body to be covered by said skin and to a shape of a similar member on an opposite side of said body,
   inverting one of said first and second pieces, and
   placing said one of said first and second pieces on the other of said first and second pieces to form said skin for said member.

8. The method of claim 7, comprising joining said lengths of fabric so that corresponding multi-axial layers of said lengths of fabric are in the same plane.

9. The method of claim 7, comprising joining said lengths of fabric so that a joint line formed by joining together said edges of said lengths of fabric runs through each of said pieces of fabric.

10. The method of claim 7, comprising joining together said edges using a laying-up process.

11. The method of claim 7, comprising producing at least one of said first and second pieces in such a way that said at least one piece of said first and second pieces is formed partly from one of said plurality of lengths of fabric and partly of another jointed thereto.

12. The method of claim 11, comprising joining together said edges of said lengths of fabric to form a joint which runs in one of the axial directions of the multi-axial fabric.

13. The method of claim 12, comprising forming said joint so that said joint runs in a longitudinal axial direction of the multi-axial fabric.

14. A method of constructing a skin for an aerofoil of an aircraft, the method comprising the steps of providing two lengths of fabric joined along their length comprising a plurality of multi-axial layers laid successively on one another, applying a skin pattern to said length of fabric so as to mark a first set of areas and a second set of areas, the first set comprising two areas of mirror-image shape and the second set comprising two areas of mirror-image shape, forming from said four areas four pieces of fabric, inverting two of said four pieces, and placing them on the corresponding pieces to form two skins.

15. The method of claim 14, further comprising the step of joining said lengths of fabric so that corresponding multi-axial layers of each length of fabric are in the same plane.

16. The method of claim 14, further comprising the step of joining said lengths of fabric so that a joint line formed thereby runs through each piece of fabric.

17. A method of constructing a skin for an aerofoil of an aircraft, the method comprising the steps of providing a length of fabric comprising a plurality of multi-axial layers having at least three differently oriented fiber layers laid successively on one another, applying a skin pattern to said length of fabric so as to mark a first set of areas and a second set of areas, the first set comprising two areas of mirror-image shape and the second set comprising two areas of mirror-image shape, forming from said four areas four pieces of fabric, inverting two of said four pieces, and placing them on the corresponding pieces to form two skins.

* * * * *

UNITED STATES PATENT AND TRADEMARK OFFICE
CERTIFICATE OF CORRECTION

PATENT NO. : 6,669,806 B1 Page 1 of 1
DATED : December 30, 2003
INVENTOR(S) : Godbehere et al.

It is certified that error appears in the above-identified patent and that said Letters Patent is hereby corrected as shown below:

Title page,
Item [*] Notice, delete "0" and insert -- 220 --.

Signed and Sealed this

Thirtieth Day of August, 2005

JON W. DUDAS
*Director of the United States Patent and Trademark Office*